(12) United States Patent
Bator et al.

(10) Patent No.: US 8,136,862 B2
(45) Date of Patent: Mar. 20, 2012

(54) BOX FRAME DUAL MODE TAILGATE

(75) Inventors: Robert Bator, Marysville, OH (US); Kenichi Kitayama, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 183 days.

(21) Appl. No.: 12/464,582

(22) Filed: May 12, 2009

(65) Prior Publication Data
US 2010/0289289 A1  Nov. 18, 2010

(51) Int. Cl.
*B62D 33/03* (2006.01)
(52) U.S. Cl. ........................................ 296/57.1
(58) Field of Classification Search ............... 296/57.1, 296/50, 56, 26.1, 26.11, 37.6, 51, 61, 62, 296/106, 146.8; 414/557; 56/341
See application file for complete search history.

(56) References Cited

U.S. PATENT DOCUMENTS

| | | | | |
|---|---|---|---|---|
| 4,353,589 A * | 10/1982 | Hartberg | ........................ | 296/50 |
| 4,678,235 A * | 7/1987 | Hagenbuch | ............... | 298/23 DF |
| 4,699,428 A * | 10/1987 | Vick | ........................ | 298/23 MD |
| 4,822,098 A * | 4/1989 | Vogt et al. | .................. | 296/146.5 |
| 4,861,088 A * | 8/1989 | Fedrigo | ........................ | 296/57.1 |
| 5,456,511 A * | 10/1995 | Webber | ....................... | 296/26.09 |
| 5,516,178 A * | 5/1996 | Grant | ............................ | 296/57.1 |
| 5,755,480 A * | 5/1998 | Bryan | ........................ | 296/26.01 |
| 5,765,892 A * | 6/1998 | Covington | ................. | 296/26.03 |
| 5,788,311 A * | 8/1998 | Tibbals | ........................... | 296/62 |
| 5,944,373 A | 8/1999 | Seksaria et al. | | |
| 5,947,540 A * | 9/1999 | Pariseau et al. | ............. | 296/57.1 |
| 6,120,076 A * | 9/2000 | Adsit et al. | ................. | 296/26.11 |
| 6,135,565 A * | 10/2000 | Bachelor | ..................... | 298/23 M |
| 6,227,594 B1 | 5/2001 | Pommeret | | |
| 6,241,307 B1 * | 6/2001 | Kim | ............................ | 296/146.8 |
| 6,471,279 B2 * | 10/2002 | Pommeret | ..................... | 296/57.1 |
| 6,550,841 B1 * | 4/2003 | Burdon et al. | ............... | 296/57.1 |
| 6,672,642 B1 * | 1/2004 | Seksaria et al. | ................. | 296/50 |
| 6,676,182 B2 * | 1/2004 | Fitts | ........................ | 296/26.11 |
| 6,776,449 B2 * | 8/2004 | Komatsu et al. | ........... | 296/146.5 |
| 6,811,067 B2 * | 11/2004 | Muizelaar et al. | ........... | 224/404 |
| 6,843,519 B2 | 1/2005 | Ojanen | | |
| 6,913,305 B1 * | 7/2005 | Kern et al. | ....................... | 296/51 |
| 6,951,357 B2 * | 10/2005 | Armstrong et al. | .......... | 296/57.1 |
| 7,093,876 B2 | 8/2006 | Romig et al. | | |
| 7,118,153 B2 * | 10/2006 | Kitayama et al. | ............ | 296/57.1 |
| 7,204,537 B1 * | 4/2007 | Oh et al. | ..................... | 296/26.09 |
| 7,213,858 B2 * | 5/2007 | Smith | ........................... | 296/57.1 |
| 7,213,859 B1 * | 5/2007 | Tan et al. | ....................... | 296/57.1 |
| 7,347,017 B2 * | 3/2008 | Shaffer, Jr. | ...................... | 40/591 |
| 7,547,056 B2 * | 6/2009 | Waldner et al. | .............. | 296/57.1 |
| 7,654,600 B2 * | 2/2010 | Stratten | ........................ | 296/50 |
| 2006/0290158 A1 * | 12/2006 | Cullison | ..................... | 296/57.1 |
| 2009/0309380 A1 * | 12/2009 | Stackpole | ................. | 296/26.09 |
| 2009/0309381 A1 * | 12/2009 | Nelson | ...................... | 296/26.11 |
| 2010/0019522 A1 * | 1/2010 | Nakamura | ...................... | 296/50 |
| 2010/0207423 A1 * | 8/2010 | Aldersley et al. | ............. | 296/106 |
| 2010/0270827 A1 * | 10/2010 | Krachler et al. | ............ | 296/146.2 |
| 2010/0289289 A1 * | 11/2010 | Bator et al. | ..................... | 296/55 |

\* cited by examiner

*Primary Examiner* — Kiran B Patel
(74) *Attorney, Agent, or Firm* — Rankin Hill & Clark LLP

(57) ABSTRACT

A tailgate assembly for a vehicle includes a multi-piece frame. The multi-piece frame includes a left frame assembly, a right frame assembly, an upper frame member and a lower frame member. The upper frame member and lower frame member extend laterally along a respective top section and a bottom section of the frame for interconnecting the left and right frame assemblies. The multi-piece frame defines a generally continuous closed boxed structure which extends about a periphery of the multi-piece frame.

15 Claims, 11 Drawing Sheets

BOX FRAME DUAL MODE TAILGATE

BACKGROUND

Exemplary embodiments herein relate to a tailgate for a motor vehicle. More particularly, the disclosure is related to a lightweight tailgate for a pick-up truck or like vehicle.

A conventional tailgate for a motor vehicle is formed from a number of steel sheets that are stamped and welded together. Sometimes, a steel reinforcement member is welded to the sheets to provide strength and rigidity to the tailgate. Latches are added on either side of the tailgate to engage a striker on the vehicle body (e.g., sides of a pick-up truck bed). A handle operates the latches to open and close the tailgate assembly. The steel tailgate can provide a durable and secure closure for the pickup bed. However, conventional tailgates generally do not have sufficient torsional stiffness and strength due, at least in part, to their reliance on a pair of full-time support cables extending from the lateral ends of the tailgate Dual-mode tailgates are also generally known. "Dual-mode" refers to the two directions or pivot axes along which a dual-mode tailgate is openable. More particularly, a dual-mode tailgate is selectively openable in a first, fold-down direction about an axis generally parallel with a bottom edge of the tailgate similar to the conventional tailgate. The dual-mode tailgate is also selectively openable in a second, side-to-side direction about an axis generally parallel with a lateral edge of the tailgate. Known dual-mode tailgates cannot have a pair of full-time support cables extending from the lateral sides of the tailgate because the dual-mode tailgate needs to be able to swing open. To increase the torsional stiffness and strength of the dual-mode tailgate, it is known to form the tailgate from a stamped sheet metal frame having a reinforced cross-sectional shape.

These conventional tailgates have, however, certain disadvantages. For instance, the tooling and stamping equipment required to manufacture the tailgates from steel is expensive. Steel is also vulnerable to corrosion upon prolonged exposure to certain environmental conditions, which detracts from the appearance of the tailgate. In addition, the use of steel results in a heavy tailgate that is, for some individuals, difficult to open and close. For example, conventional tailgate can weigh between 30 and 40 pounds. Such a heavy tailgate also adds to the overall weight of the motor vehicle, which unnecessarily increases fuel consumption and wear on the vehicle.

Consequently, thermoplastic polymer panels have been incorporated into the conventional tailgates in an attempt to reduce their weight. However, merely substituting plastic components for the steel inner and outer panels of existing tailgate designs do not provide sufficient strength to meet load requirements. The plastic panels provide reduced strength and rigidity compared with steel panels. Further, the plastic panels can flex under normal loads and provide only limited torsional resistance.

A lightweight, durable tailgate is provided that is sufficient torsionally stiff and string such that it can be optionally supported with only a single support cable when in the fold-down position.

BRIEF DESCRIPTION

According to one aspect, a tailgate assembly for a vehicle includes a multi-piece frame. The multi-piece frame includes a left frame assembly, a right frame assembly, an upper frame member and a lower frame member. The upper frame member and lower frame member extend laterally along a respective top section and a bottom section of the frame for interconnecting the left and right frame assemblies. The multi-piece frame defines a generally continuous closed boxed structure which extends about a periphery of the multi-piece frame.

According to another aspect, a vehicle load-carrying bed comprises a bed floor, a front wall extending upwardly adjacent a front edge of the bed floor, a first side wall extending upwardly adjacent a first side edge of the bed floor, and a second side wall extending upwardly adjacent a second, opposite side edge of the bed floor. A dual-axis tailgate is positioned along a rear edge of the bed floor and extends between the first and second sidewalls. The tailgate is pivotally movable about an axis generally parallel with the rear edge of the bed floor and about an axis generally parallel with a vehicle bed edge of the first side wall. The tailgate comprises a multi-piece frame. The frame includes a left frame assembly, a right frame assembly, an upper beam and a lower beam for interconnecting the left and right frame assemblies. Each of the left frame assembly, right frame assembly, upper beam and the lower beam includes a boxed structure for increasing the rigidity of the frame.

According to yet another aspect, a tailgate assembly is mounted along an open edge of a vehicle's open load-carrying bed. The tailgate assembly comprises a frame assembly pivotally connected to a wall forming the vehicle's open load-carrying bed. The frame assembly includes a plurality of generally closed boxed structures fixedly connected together to form a continuous, uninterrupted hollow chamber for increasing the rigidity and reducing the weight of the frame assembly.

DETAILED DESCRIPTION

Figure 1:
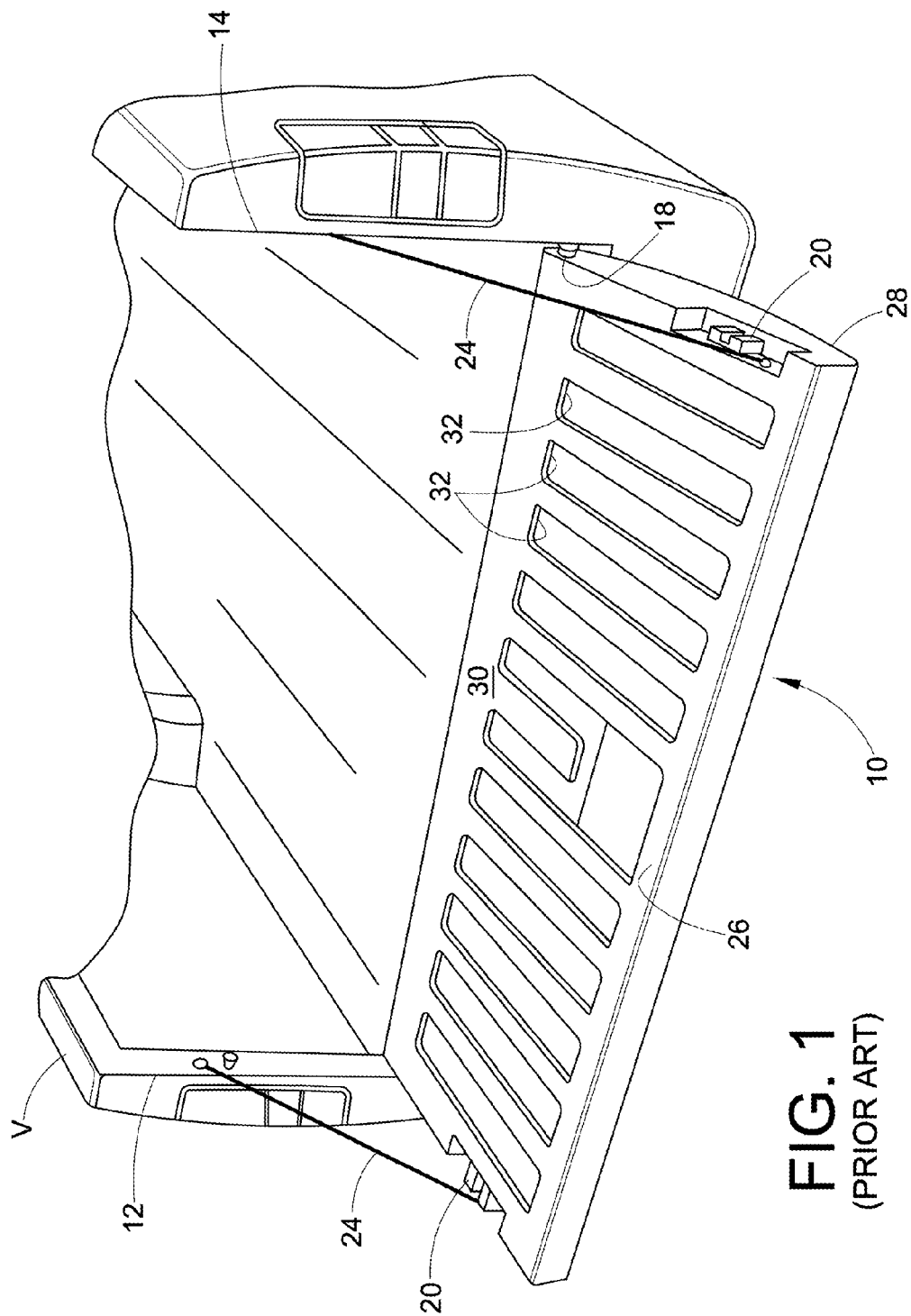
FIG. 1 is a fragmentary, rear perspective view of a pickup truck including a conventional tailgate assembly.

It should, of course, be understood that the description and drawings herein are merely illustrative and that various modifications and changes can be made in the structures disclosed without departing from the present disclosure. It will also be appreciated that the various identified components of the tailgate disclosed herein are merely terms of art that may vary from one manufacturer to another and should not be deemed to limit the present disclosure. All references to direction and position, unless otherwise indicated, refer to the orientation of the tailgate illustrated in the drawings and should not be construed as limiting the claims appended hereto. Like numerals refer to like parts throughout the several views.

With reference to FIG. 1, a conventional tailgate 10, also referred to herein as a tailgate assembly and a vehicle closure structure, is shown as a component of a load-carrying bed of a vehicle V. In the illustrated embodiment, the vehicle V is a sport utility truck, but it is to be appreciated by those skilled in the art that the vehicle could be any other type of vehicle having a tailgate or closure structure, such as a pickup truck, utility truck or other vehicle. The tailgate 10 is pivotally coupled to opposing sidewalls 12, 14 of the vehicle V. The tailgate 10 includes conventional hinges 18 (one shown), latches 20, a handle (not shown) for controlling the release of the latches 20, and cable travel limits 24 for stopping movement of the tailgate 10 away from the sidewalls 12, 14. The tailgate 10 includes an inner structural panel 26 coupled to an outer decorative panel 28. The inner structural panel 26 includes a loading surface 30 which can have a plurality of recesses 32 formed therealong.

Figure 2:
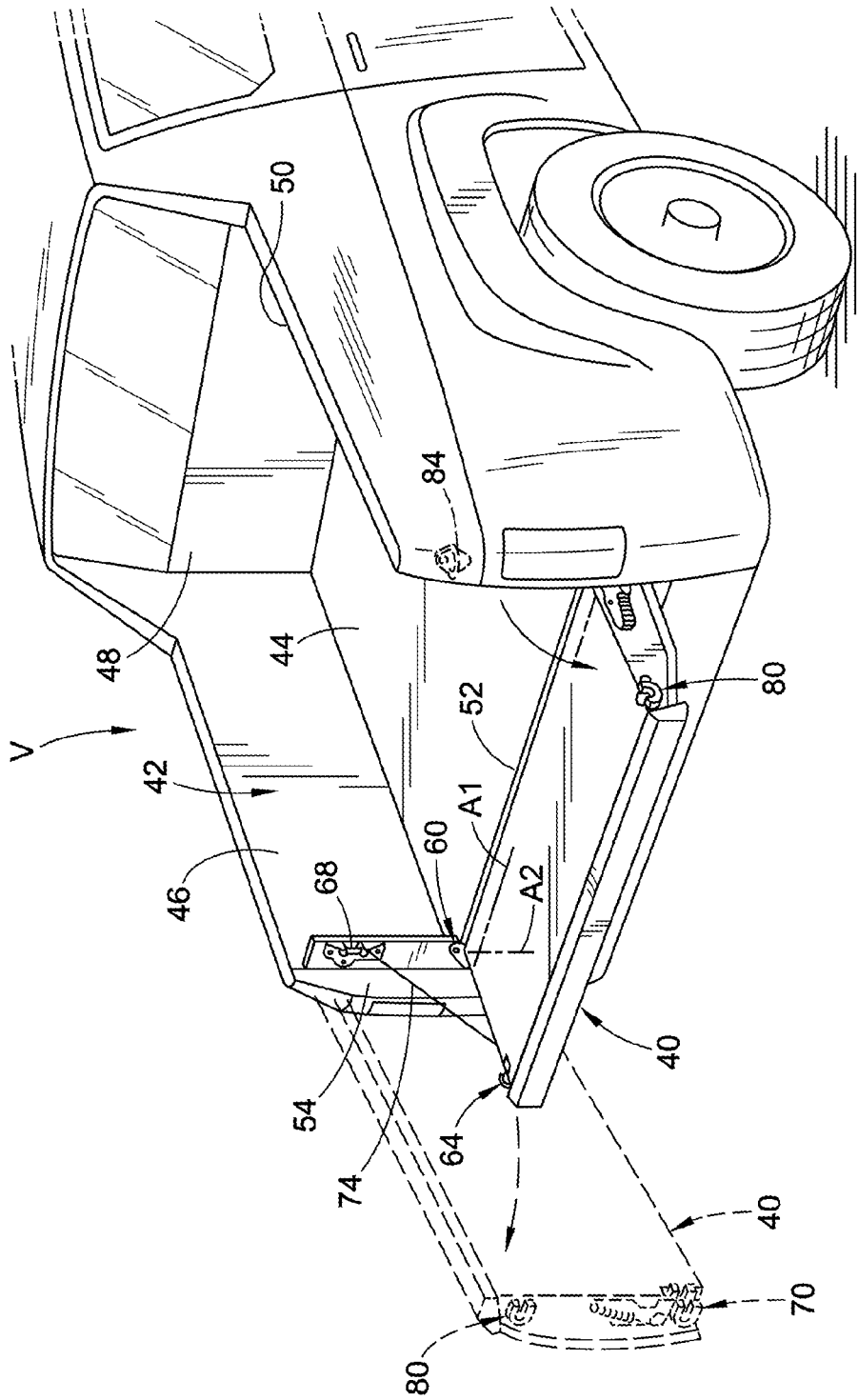
FIG. 2 is a fragmentary, rear perspective view of a pickup truck including a dual-mode tailgate assembly opening in a first, fold-down direction and a second, side-to-side direction.

Referring now to FIG. 2, a dual-mode or dual-axis tailgate 40, again also referred to herein as a tailgate assembly and a vehicle closure structure, is shown as a component of a vehicle's load-carrying bed 42. Generally, the bed 42 includes a bed floor 44 having a plurality of walls 46, 48, 50 extending upwardly adjacent three edges and forming a portion of a vehicle body of the vehicle V.

The dual-mode or dual-axis tailgate 40 is positioned along an open, rear edge 52 of the bed floor 44, and extends between the first and second sidewalls 46, 50 to selectively close an open end of the load-carrying bed 42. The tailgate 40 is mounted to the vehicle V and is able to pivot about a first axis A1 for movement between a closed position and a fold-open position. The first axis A1 is generally horizontal and parallel with the rear edge 52 of the bed floor 44. The tailgate 40 is also alternatively able to pivot about a second axis A2 for movement between the closed position and a swing-open position. The second axis A2 is generally vertical and parallel with a first side wall end 54 which also defines the opening in which the tailgate 40 is disposed. The second axis A2 is generally normal relative to the first axis A1. To facilitate the dual-mode action of the tailgate 40, a dual-mode hinge assembly 60 attaches or is mounted to the tailgate 40 at or adjacent a first corner of the tailgate (lower left corner of FIG. 2). The dual-mode hinge assembly 60 pivotally connects the tailgate 40, along the first and second axes A1 and A2 to the vehicle V.

A first hinge/lock assembly 64 attaches or is mounted to the tailgate 40 at or adjacent a second corner of the tailgate (upper left corner in FIG. 2) and is spaced from the hinge assembly 60 in a first direction. The first hinge/lock assembly 64 selectively latches or locks to a first hinge/lock striker 68 to releasably lock the tailgate 40 to the vehicle V. When operating as a hinge, the first hinge/lock assembly 64 cooperates with the hinge assembly 60 to pivotally support the tailgate 40 along or about the second axis A2 and allows the tailgate 40 to move between the tailgate closed position and the swing-open position.

A second hinge/lock assembly 70 attaches or is mounted to the tailgate 40 at or adjacent a third corner of the tailgate (lower right corner in FIG. 2) and is spaced from the hinge assembly 40 in a second direction. The second hinge/lock assembly 70 selectively latches or locks to a second hinge/lock striker (not visible) to releasably lock the tailgate 40 to the vehicle V. The second hinge/lock assembly 70 cooperates with the hinge assembly 60 to pivotally support the tailgate 40 along or about the first axis A1 and allows the tailgate 40 to move between the tailgate closed position and the fold-open or flip-down position. A support cable 74 is optionally provided for supporting the tailgate 40 in the flip-down position.

A locking assembly 80 attaches or is mounted to the tailgate 40 at or adjacent a fourth corner of the tailgate (upper right corner in FIG. 2). The locking assembly 80 selectively latches to a locking striker 84 to releasably lock the tailgate 40 to the vehicle V. The tailgate 40 is openable toward or to the fold-open position about the first axis A1 when both the first hinge/lock assembly 64 is unlatched from the first hinge/lock striker 68 and the locking assembly 80 is unlatched from the locking striker 84. The tailgate 40 is openable toward or to the swing-open position about the second axis A2 when both the second hinge/lock assembly 70 is unlatched from the second hinge/lock striker (not visible) and the locking assembly 82 is unlatched from the locking striker 84.

Figure 3:
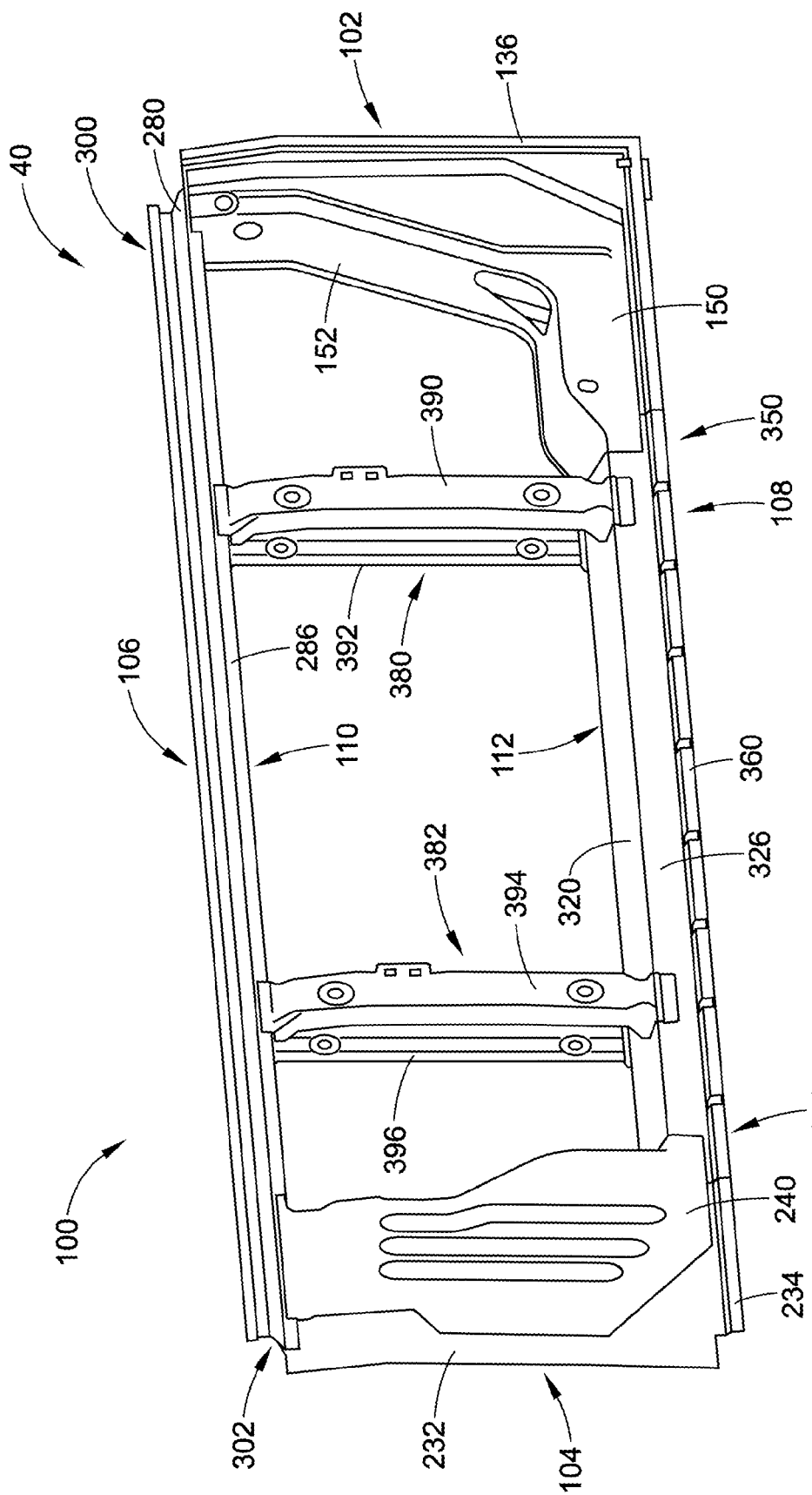
FIG. 3 is a front perspective view of an exemplary embodiment of a frame of the tailgate assembly of FIG. 2.
Figure 4:
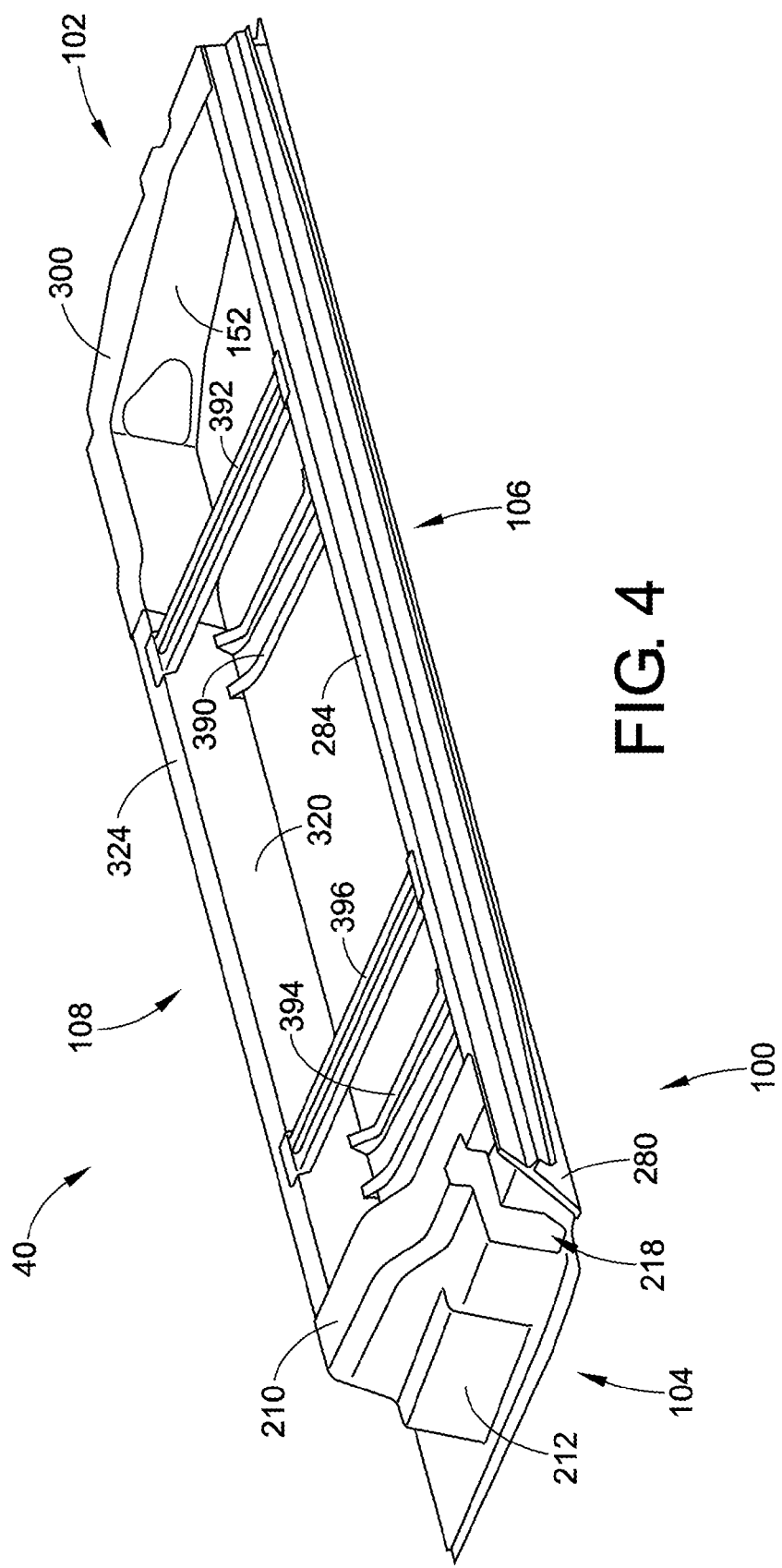
FIG. 4 is a rear perspective view of the frame of FIG. 3.
Figure 5:
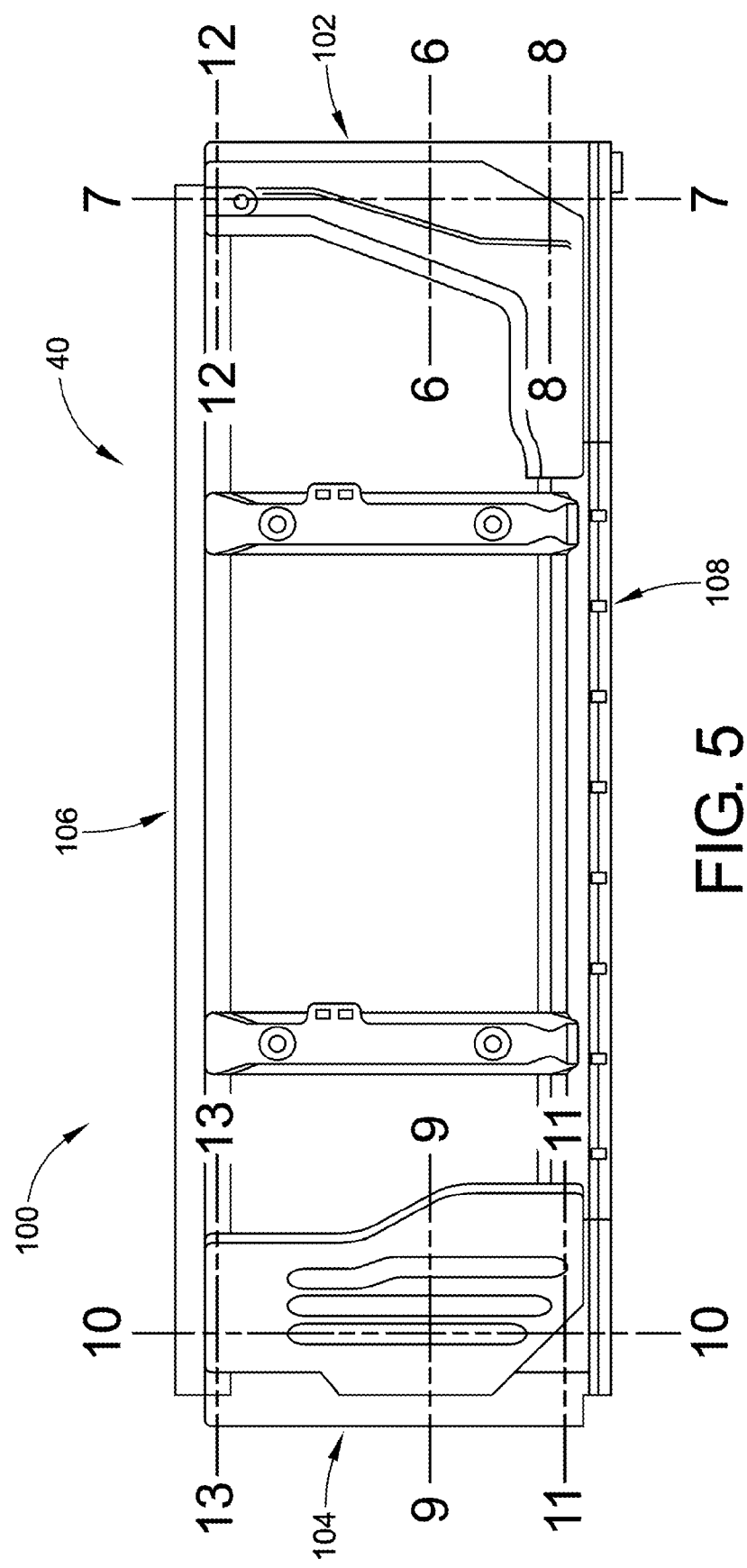
FIG. 5 is a front elevational view of the frame of FIG. 3.

With reference to FIGS. 3-5, the tailgate assembly 40 comprises a multi-piece frame 100. The multi-piece frame 100 includes a right frame assembly 102, a left frame assembly 104, an upper frame member 106 and a lower frame member 108. The upper frame member 106 and lower frame member 108 extend laterally along a respective top section 110 and a bottom section 112 of the frame 100 for interconnecting the right frame assembly 102 and left frame assembly 104. As will be discussed in greater detail below, the multi-piece frame 100 defines a generally continuous, uninterrupted closed boxed structure which extends about a periphery of the frame 100.

Figure 6:
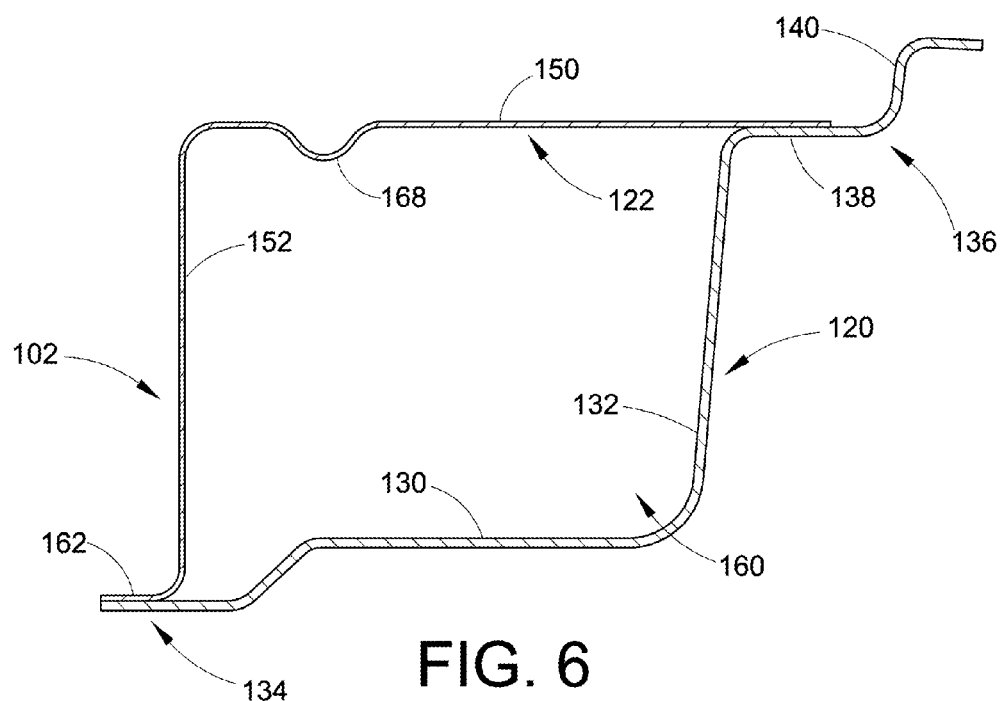
FIG. 6 is a cross-sectional view of the frame of FIG. 5 taken generally along line 6-6 of FIG. 5.
Figure 7:
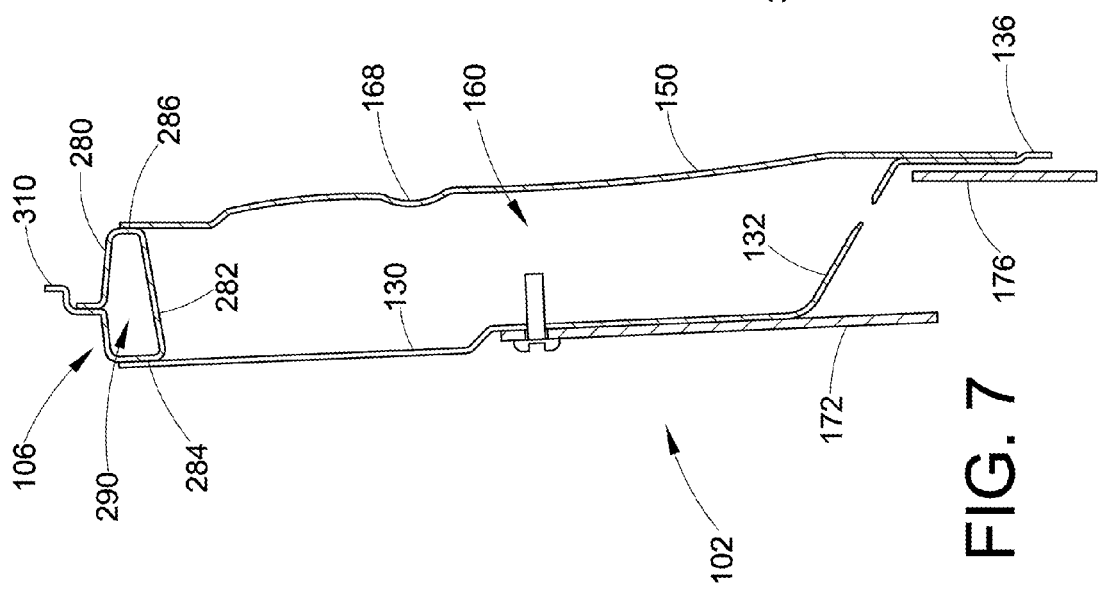
FIG. 7 is a cross-sectional view of the frame of FIG. 5 taken generally along line 7-7 of FIG. 5.

With additional reference to FIGS. 6 and 7, the generally L-shaped right frame assembly 102 includes a first or inner frame member 120 secured to a second or outer frame member 122. The first frame member 120 includes a first wall 130 and a second wall 132 extending from the first wall 130, the walls 130, 132 oriented generally normal or perpendicular relative to one another. An end section of the first wall 130 includes a step portion 134 which extends toward the left frame assembly 104. A flange 136 extends outwardly from an end section of the second wall 132. The flange 136 includes a first section 138 which is generally parallel to the first wall 130 and a generally L-shaped second section 140 which extends outwardly from the first section 138. As shown in FIG. 3, the flange 136 spans vertically between the upper and lower frame members 106, 108 and horizontally toward an end of the lower frame member 108.

Similarly, the second frame member 122 includes a first wall 150 and a second wall 152 extending from the first wall 152, the walls 150, 152 oriented generally normal or perpendicular relative to one another. The first wall 150 is spaced from and generally parallel to the first wall 130 and the second wall 152 is spaced from and generally parallel to the second wall 132. As shown, the first frame member 120 and second frame member 122 together define a first hollow chamber 160, thereby forming a first boxed structure. The first hollow chamber 160 extends the entire height of the right frame assembly 102. An end section of the first wall 150 is secured to the flange 136. An end section of the second wall 152 includes an outwardly extending flange 162 which is secured to the step portion 134.

Figure 8:
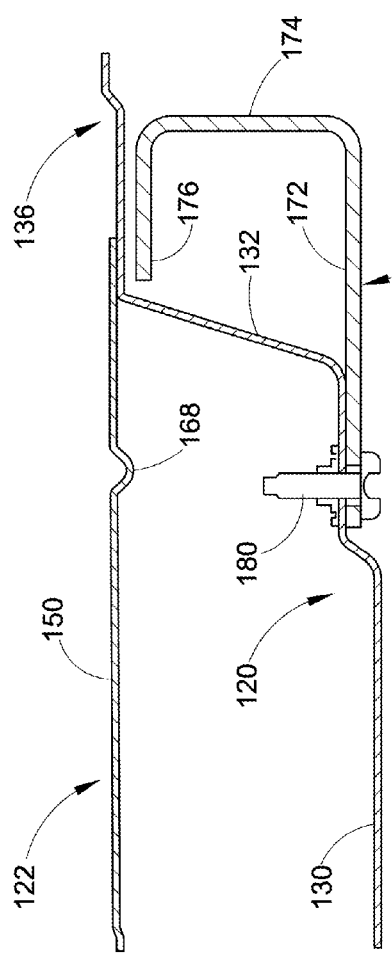
FIG. 8 is a cross-sectional view of the frame of FIG. 5 taken generally along line 8-8 of FIG. 5.

At least one of the first and second frame members 120, 122 includes a stiffening member. In the depicted embodiment, the second frame member 122 includes a stiffening member or inwardly depressed rib 168 which extends generally perpendicularly between the upper and lower frame members 106, 108. As shown, the stiffening member 168 is generally S-shaped; although, this is not required. The stiffening member 168 provides additional stiffness to the right frame assembly 102. As shown in FIGS. 7 and 8, a generally U-shaped support member 170 can be attached to the first frame member 120 to provide additional rigidity to the right frame assembly 102. Particularly, the support member 170 includes a first leg 172, a base 174 and a second leg 176. The first leg 172 is attached to the first wall 130 via a fastener 180 (e.g., a screw or some other like type of fastener). The base 174 and second leg 176 of the support member 170 extend beneath the flange 136.

Figure 9:
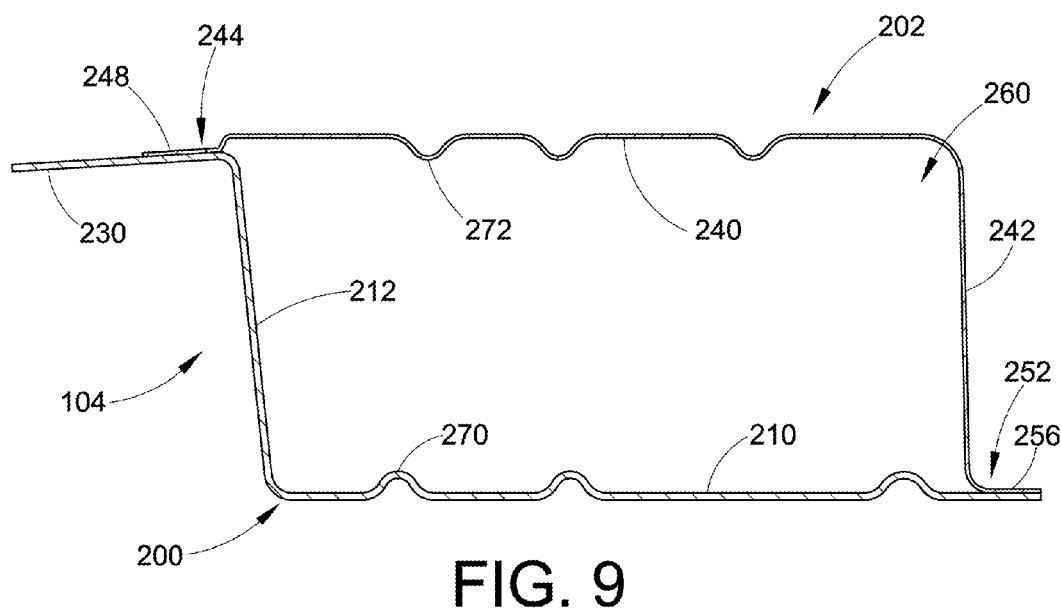
FIG. 9 is a cross-sectional view of the frame of FIG. 5 taken generally along line 9-9 of FIG. 5.
Figure 11:
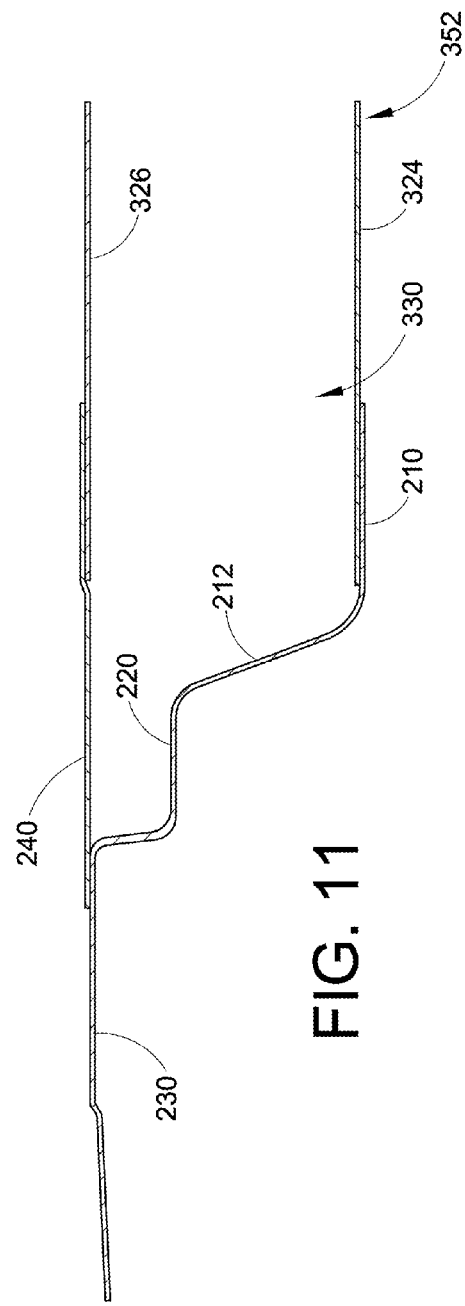
FIG. 11 is a cross-sectional view of the frame of FIG. 5 taken generally along line 11-11 of FIG. 5.
Figure 10:
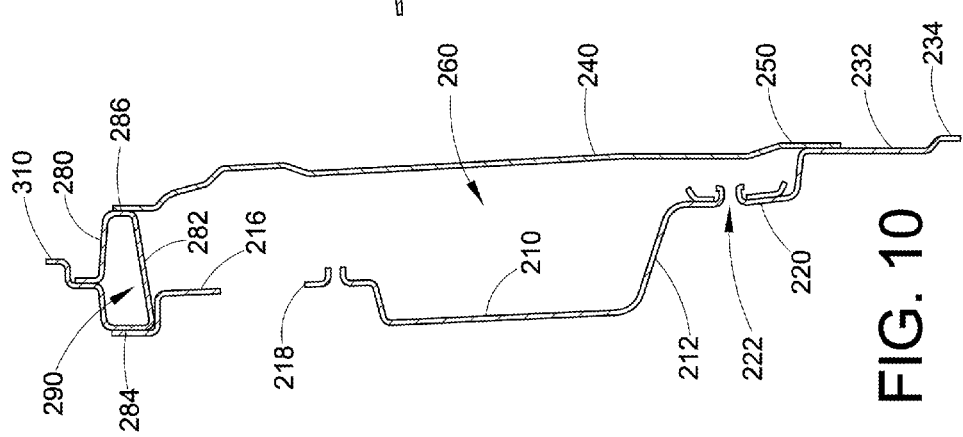
FIG. 10 is a cross-sectional view of the frame of FIG. 5 taken generally along line 10-10 of FIG. 5.

With reference now to FIGS. 9-11, the left frame assembly 104 includes a first or inner frame member 200 secured to a second or outer frame member 202. The first frame member 200 includes a first wall 210 and a second wall 212 extending from the first wall 210, the walls 210, 212 oriented generally normal or perpendicular relative to one another. The first wall 210 includes a raised section 216 having an opening 218 therein for receiving associated hardware of the tailgate 40 (e.g. a dual-mode hinge assembly and/or associated hardware for attaching the dual-mode hinge assembly to the frame). A portion of the second wall 212 includes a ledge 220 which extends generally parallel to the first wall 210. A horizontal section of the ledge 220 has an opening 222 therein. As shown in FIG. 9, a first, generally vertical flange 230 extends outwardly from an end section of the second wall 212 and is generally parallel to the first wall 210. The first flange 230 spans generally between the upper and lower frame members 106, 108. As shown in FIG. 10, a second, generally horizontal flange 232 also extends outwardly from the end section of the second wall 212 and is generally parallel to the first wall 210. The second flange 232 includes a generally L-shaped second section 234.

The second frame member 202 includes a first wall 240 and a second wall 242 extending from the first wall 240, the walls 240, 242 oriented generally normal or perpendicular relative to one another. A vertical section 244 of the first wall 240 includes an inward step portion 248 which is secured to the first flange 230. A horizontal section 250 of the first wall 240 is secured to the second flange 232. An end section 252 of the second wall 242 includes an inwardly extending flange 256 which is secured to the first wall 210 of the first frame member 200.

As shown, the first wall 210 is spaced from and generally parallel to the first wall 240, and the second wall 212 is spaced from and generally parallel to the second wall 242. The first frame member 200 and second frame member 202 together define a second hollow chamber 260, thereby forming a second boxed structure. The second hollow chamber extends the entire height of the left frame assembly 104. At least one of the first and second frame members 200, 202 includes a stiffening member. In the depicted embodiment, both the first wall 210 of the first frame member 200 and the first wall 240 of the second frame member 202 include a plurality of stiffening ribs 270 and 272, respectively, which extend generally perpendicular between the upper and lower frame members 106, 108. Each rib 270 and 272, which functions as a stiffening member, is integrally formed in each respective first wall 210 and 240.

Figure 12:
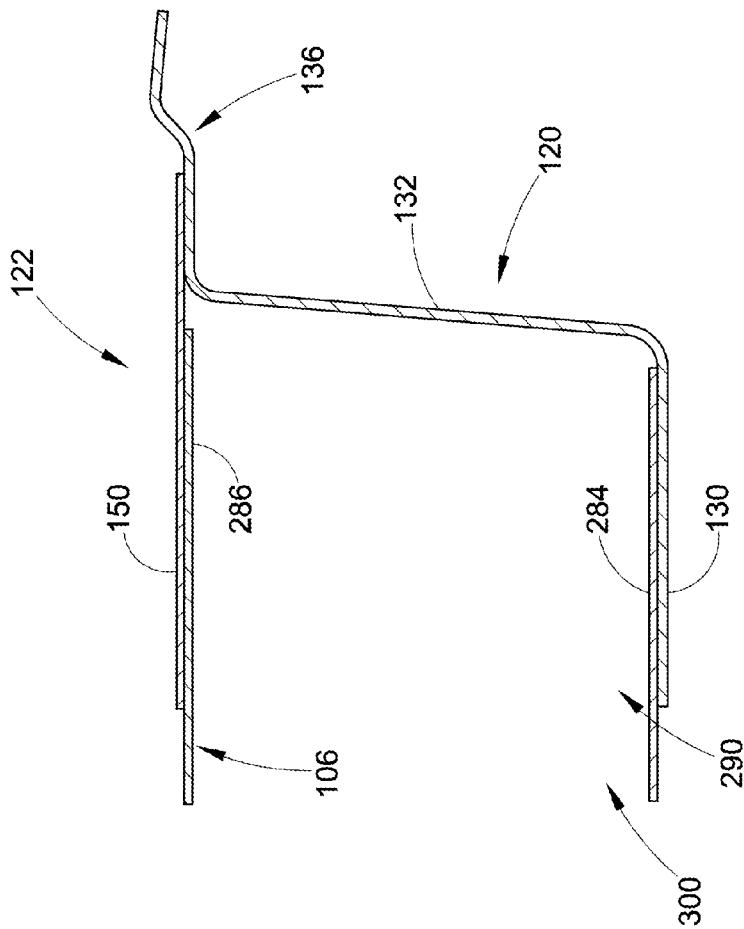
FIG. 12 is a cross-sectional view of the frame of FIG. 5 taken generally along line 12-12 of FIG. 5.
Figure 13:
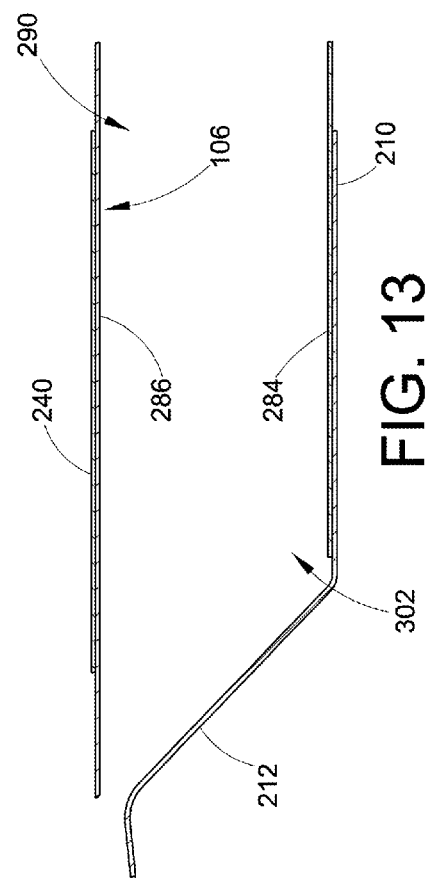
FIG. 13 is a cross-sectional view of the frame of FIG. 5 taken generally along line 13-13 of FIG. 5.

With reference again to FIGS. 7 and 10, the upper frame member or upper beam 106 includes a top wall 280, a bottom wall 282 and first and second side walls 284 and 286, respectively. In the depicted embodiment, the first side wall 284 is larger than the second side wall 286; although, this is not required. The walls 280, 282, 284 and 286 of the upper frame member 106 together define a third hollow chamber 290, thereby forming a third boxed structure. The third hollow chamber 290 extends the entire length of the upper beam 106. A first end section 300 (see FIG. 12) of the upper frame member 106 is fixedly attached between the first walls 130, 150 of the respective first and second frame members 120, 122. A second end section 302 (see FIG. 13) of the upper frame member 106 is fixedly attached between the first walls 210, 240 of the respective first and second frame members 200, 202. A laterally extending flange 310 is located on the top wall 280. As shown, the flange 310 is integrally formed with the upper beam 106 and has a stepped configuration.

With reference again to FIGS. 3 and 4, the lower frame member or lower beam 108 includes a top wall 320, a bottom wall (not shown) and first and second side walls 324 and 326, respectively. The walls 320, 322, 324 and 326 of the lower frame member 108 together define a fourth hollow chamber 330, thereby forming a fourth boxed structure. The fourth hollow chamber 330 extends the entire length of the lower beam 108. A first end section 350 of the lower frame member 108 is fixedly attached between the first wall 130 of the first frame member 120 and the first and second walls 150, 152 of the second frame member 122. With additional reference to FIG. 11, a second end section 352 of the lower frame member 108 is also secured between the respective first walls 210 and 240 of the first and second frame members 200 and 202. A laterally extending flange 360 is located on the top wall 326. As shown, the flange 360 is integrally formed with the lower beam 108 and has a configuration similar to flange 136 and second flange 232.

With continued reference to FIGS. 3 and 4, each of the upper and lower frame members or beams 106, 108 have a substantially hollow construction which further contributes to the reduced weight of the tailgate assembly 40. More particularly, the upper beam 106 is generally rectangular in cross-section and includes the hollow chamber 290 which extends the entire length of the beam 106. Similarly, the lower beam 108 is generally rectangular in cross-section and includes the hollow chamber 330 which extends the entire length of the beam 108. As shown, the hollow chambers 290, 330 of the upper and lower beams 106, 108 are in communication with the hollow chambers 160, 260 of the right and left frame assemblies 102, 104 thereby forming a continuous, uninterrupted generally closed box structure which extends along the entire periphery of the frame 100.

The generally closed, continuous boxed structure defined by the multi-piece frame 100 increases the rigidity of the tailgate 40. The need for increased torsional stiffness and strength are necessitated by the possibility of one lateral edge of the dual-mode tailgate 40 being unsupported away from a fold-down axis when the tailgate 40 is in the fold-down position. For example, if any downward loading is applied near the distal end of the unsupported lateral edge, i.e., the outer corner of the tailgate 40 adjacent the unsupported lateral edge, a relatively large torsional force or load will act across the tailgate 40. To absorb any such large torsional loads, the tailgate 40 is desirably torsionally stiff and strong for purposes of preventing damage to the tailgate 40 and/or the vehicle V carrying the tailgate. The multi-piece frame 100 provides increased torsional stiffness and strength without unduly increasing the thickness of the tailgate 40. Thus, the lightweight, strong, durable tailgate has minimal impact upon vehicle cost. Further, by reducing the weight of the tailgate 40, fuel efficiency and vehicle payload capacity is improved. Additionally, any improvements that reduce manufacturing costs, increase manufacturing efficiency, decrease the overall weight of the tailgate 40 while maintaining or improving the hem quality of the tailgate 40 and the fit and finish of the overall vehicle and/or improve the reliability of the tailgate 40 are also deemed desirable.

The upper and lower frame members 106, 108 can be formed from a metal alloy and are held in spaced relationship from one another by the right and left frame assemblies 102, 104. The first frame members 120, 200 and the second frame members 122, 202 of the respective right and left frame assemblies 102, 104 can be made from a rigid material (e.g. lightweight steel or even aluminum) to maintain appropriate separation of the upper and lower beams relative to one another. Although, it should be appreciated that the components 102, 104, 106, 108 of the multi-piece frame 100 can be made from a variety of metals, such as, but not limited to, steel, aluminum and magnesium. The first frame members 120, 200 and second frame members 122, 202 of the respective left and right frame assemblies 102, 104 can be affixed to the upper and lower beams 106, 108 in any of numerous ways including by welding, adhesive, sonic loading, fasteners, screws, or any combination thereof.

With reference again to FIGS. 3 and 4, the tailgate assembly 100 can further include a first support 380 spaced inwardly from the right frame assembly 102 and a second support 382 spaced inwardly from the left frame assembly 104. The first support 380 includes first and second spaced apart beams 390 and 392 having end sections fixedly attached to the upper and lower frame members 106 and 108. The first and second beams 390 and 392 extend between the upper and lower frame members 106, 108 and are oriented generally normal or perpendicular relative thereto. Similarly, the second support 382 includes first and second spaced apart beams 394 and 396 having end sections fixedly attached to the upper and lower frame members 106 and 108. The first and second beams 394 and 396 extend between the upper and lower frame members 106, 108 and are oriented generally normal or perpendicular relative thereto. As shown in FIG. 3, an outer surface of the first beams 390, 394 together with an outer surface of each of the right frame assembly 102, left frame assembly 104, upper frame member 106 and lower frame member 108 define a generally common surface. This allows for the easy attachment of a cladding (not shown) to the frame 100, if desired.

Figure 14:
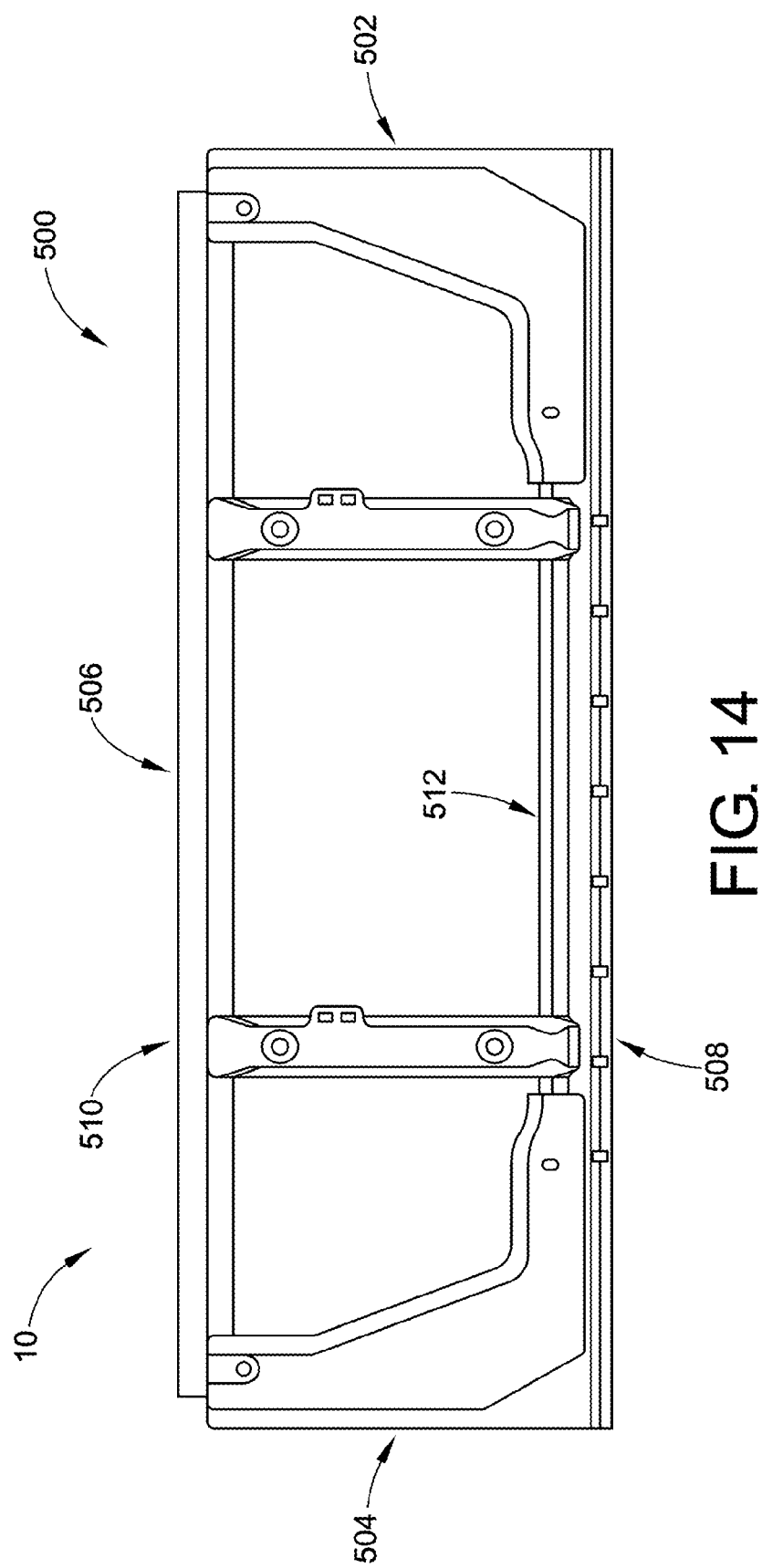
FIG. 14 is a front elevational view of an exemplary embodiment of a frame of the tailgate assembly of FIG. 1.

With reference now to FIG. 14, an exemplary embodiment of a multi-piece frame 500 of the tailgate assembly 10 is illustrated. The multi-piece frame 500 includes a right frame assembly 502, a left frame assembly 504, an upper frame member 506 and a lower frame member 508. The upper frame member 506 and lower frame member 508 extend laterally along a respective top section 510 and a bottom section 512 of the frame 500 for interconnecting the right frame assembly 502 and left frame assembly 504. The right frame assembly 502 is structurally similar to the right frame assembly 102. The left frame assembly 504 is a mirror image of the right frame assembly 502. This allows the frame 500 to be used as a single axis tailgate having a support cable attached to each right and left frame assembly 502, 504. The upper and lower beams 506, 508 are structurally similar to the upper and lower beams 106, 108. Similar to the previous frame 100, the multi-piece frame 500 defines generally closed boxed structures fixedly connected together to form a continuous, uninterrupted hollow chamber which extends about a periphery of the frame 500 to increase the torsional stiffness and strength of the frame 500.

Figure 16:
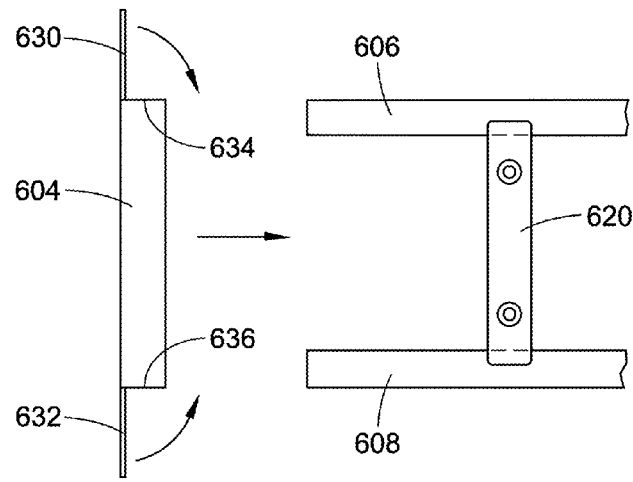
FIG. 16 is a partially exploded front elevational view of the frame of FIG. 15.
Figure 15:
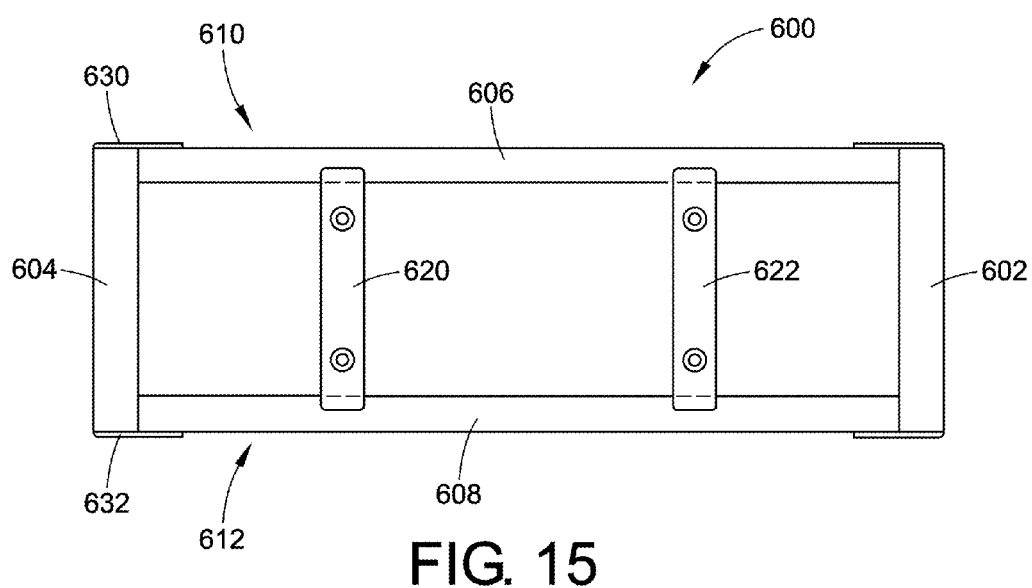
FIG. 15 is a front elevational view of another exemplary embodiment of a frame of the tailgate assembly of FIG. 1.

With reference now to FIG. 15, another exemplary embodiment of a multi-piece frame 600 of the tailgate assembly 10 is illustrated. The multi-piece frame 600 includes a right frame member 602, a left frame member 604, an upper frame member 606 and a lower frame member 608. The upper frame member 606 and lower frame member 608 extend laterally along a respective top section 610 and a bottom section 612 of the frame 600 for interconnecting the right frame member 602 and left frame member 604. Each of the frame members 602, 604, 606, 608 is generally rectangular in cross-section and includes a hollow chamber which extends the entire length of the frame member. First and second support members 620 and 622, respectively, can extend between the upper and lower frame members 608 and 608 and are oriented generally normal or perpendicular relative thereto. As shown in FIG. 16, the left frame assembly 604 includes first and second flaps 630 and 632, respectively, which extend from respective end sections 634 and 636 of the left frame member 604. To assembly to frame 600, the first and second flaps 630, 632 are configured to bend or fold over the upper and lower frame members 606, 608 and are fixedly attached thereto by, for example, welding. The right frame member 602 is structurally similar to the left frame member 604. The frame 600 can be used as a single axis tailgate having a support cable attached to each right and left frame member 602, 604. Similar to the previous frames, the multi-piece frame 600 defines a generally continuous closed boxed structure which extends about a periphery of the frame to increase the torsional stiffness and strength of the frame.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A tailgate assembly mounted along an open edge of a vehicle's load-carrying bed, the tailgate assembly comprising:
a multi-piece frame including a left frame assembly, a right frame assembly, an upper frame member and a lower frame member, the upper frame member and lower frame member extending laterally along a respective top section and a bottom section of the frame for interconnecting the left and right frame assemblies, and at least one support located between the left and right frame assemblies and extending between the upper and lower frame members, each of the left frame assembly, right frame assembly, upper frame member and lower frame member of the multi-piece frame defining a closed boxed structure which when connected together form a continuous, uninterrupted hollow chamber that extends about a periphery of the multi-piece frame.

2. The tailgate assembly of claim 1, wherein the left frame assembly includes a first frame member secured to a second frame member, the first and second frame members defining a hollow chamber, the hollow chamber extending between and connecting the upper and lower frame members.

3. The tailgate assembly of claim 2, wherein the first frame member includes a first wall and a second wall extending from the first wall and oriented generally normal relative thereto, and the second frame member includes a first wall and a second wall extending from the first wall and oriented generally normal relative thereto.

4. The tailgate assembly of claim 3, wherein the first wall of the first frame member is spaced from and generally parallel to the first wall of the second frame member, and the second wall of the first frame member is spaced from and generally parallel to the second wall of the second frame member.

5. The tailgate assembly of claim 2, wherein at least one of the first and second frame members includes a stiffening member extending between the upper and lower frame members and oriented generally perpendicular relative to the upper and lower frame members.

6. The tailgate assembly of claim 5, wherein each of the first frame member and second frame member integrally includes a stiffening member extending generally between the upper and lower frame members and oriented generally perpendicular relative to the upper and lower frame members.

7. The tailgate assembly of claim 1, wherein the right frame assembly includes a first frame member secured to a second frame member, the first and second frame members defining a hollow chamber, the hollow chamber extending between and connecting the upper and lower frame members.

8. The tailgate assembly of claim 7, wherein the first frame member includes a first wall and a second wall, the second wall extending from the first wall and oriented generally normal relative thereto, and the second frame member includes a first wall and a second wall, the second wall of the second frame member extending from the first wall and oriented generally normal relative thereto.

9. The tailgate assembly of claim 8, wherein the first wall of the first frame member is spaced from and generally parallel to the first wall of the second frame member, and the second wall of the first frame member is spaced from and generally parallel to the second wall of the second frame member.

10. The tailgate assembly of claim 7, wherein at least one of the first and second frame members includes a stiffening member extending generally perpendicularly between the upper and lower frame members.

11. The tailgate assembly of claim 1, wherein an outer surface of the at least one center support together with an outer surface of each of the left frame assembly, right frame assembly, upper frame member and lower frame member define a generally common surface.

12. The tailgate assembly of claim 1, wherein each of the upper frame member and the lower frame member includes a hollow chamber extending the entire length of the frame member and an integrally formed laterally extending flange.

13. A tailgate assembly mounted along an open edge of a vehicle's load-carrying bed, the tailgate assembly comprising:
a multi-piece frame assembly including a plurality of separate, generally closed boxed structures fixedly connected together to form a continuous, uninterrupted hollow chamber defined by each of the closed boxed structures that extends about a periphery of the frame assembly, the generally closed boxed structures include a left frame assembly, a right frame assembly, an upper frame member and a lower frame member for interconnecting the left and right frame assemblies, and the frame assembly further including a support spaced between the left frame assembly and the right frame assembly, the support extending between the upper and lower frame members,
wherein each of the left frame assembly and right frame assembly includes an inner frame member secured to an outer frame member, left end portions of each of the upper frame member and lower frame member being fixed between the inner frame member and the outer frame member of the left frame assembly and right end portions of each of the upper frame member and lower frame member being fixed between the inner frame member and the outer frame member of the right frame assembly.

14. The tailgate assembly of claim 13, wherein the left frame assembly includes a pair of spaced apart, generally parallel walls, one of the walls includes a stiffening rib extending between the upper and lower frame members and projecting toward the other wall.

15. The tailgate assembly of claim 13, wherein the right frame assembly includes a pair of spaced apart, generally parallel walls, one of the walls includes a stiffening rib extending between the upper and lower frame members and projecting toward the other wall.

* * * * *